United States Patent
Dejneka et al.

(10) Patent No.: US 8,341,976 B2
(45) Date of Patent: *Jan. 1, 2013

(54) METHOD OF SEPARATING STRENGTHENED GLASS

(75) Inventors: Matthew John Dejneka, Corning, NY (US); Alexander Mikhailovich Streltsov, Corning, NY (US); Daniel R. Harvey, Bath, NY (US); Sinue Gomez, Corning, NY (US); Timothy Michael Gross, Waverly, NY (US)

(73) Assignee: Corning Incorporated, Corning, NY (US)

( * ) Notice: Subject to any disclaimer, the term of this patent is extended or adjusted under 35 U.S.C. 154(b) by 370 days.

This patent is subject to a terminal disclaimer.

(21) Appl. No.: 12/845,066

(22) Filed: Jul. 28, 2010

(65) Prior Publication Data
US 2010/0291353 A1 Nov. 18, 2010

Related U.S. Application Data

(63) Continuation-in-part of application No. 12/388,837, filed on Feb. 19, 2009.

(60) Provisional application No. 61/235,767, filed on Aug. 21, 2009.

(51) Int. Cl.
*C03B 33/02* (2006.01)

(52) U.S. Cl. .......................................... 65/112

(58) Field of Classification Search ............. 65/105, 65/112, 174
See application file for complete search history.

(56) References Cited

U.S. PATENT DOCUMENTS 4,468,534 A 8/1984 Boddicker
(Continued)

FOREIGN PATENT DOCUMENTS

DE 102007009786 8/2008
(Continued)

OTHER PUBLICATIONS

U.S. Appl. No. 12/277,573, by Matthew J. Dejneka et al, titled "Glasses Having Improved Toughness and Scratch Resistance", filed Nov. 25, 2008.

(Continued)

*Primary Examiner* — Matthew Daniels
*Assistant Examiner* — Erin Snelting
(74) *Attorney, Agent, or Firm* — Robert P. Santandrea

(57) ABSTRACT

A method of cutting a glass sheet that has been thermally or chemically strengthened along a predetermined line, axis, or direction with high speed and with minimum damage on the cut edges. The strengthened glass sheet may be an aluminoborosilicate glass material having at least one alkali metal oxide modifier, and the ratio $$\frac{Al_2O_3(\text{mol \%}) + B_2O_3(\text{mol \%})}{\sum \text{ modifiers (mol \%)}} > 1.$$

At least one damage line is formed within the strengthened glass sheet. The at least one damage line is formed outside the strengthened compressive stress surface layers and within the tensile stress layer of the strengthened glass sheet. The at least one damage line may be formed by laser treatment. A crack is initiated in the strengthened glass sheet and propagated along the at least one damage line to separate the strengthened glass sheet along the predetermined line, axis, or direction into at least two pieces.

13 Claims, 3 Drawing Sheets

U.S. PATENT DOCUMENTS

| | | | |
|---|---|---|---|
| 4,702,042 A | 10/1987 | Herrington et al. | |
| 6,211,488 B1 | 4/2001 | Hoekstra et al. | |
| 6,676,878 B2 | 1/2004 | O'Brien et al. | |
| 6,949,485 B2 * | 9/2005 | Nakashima et al. | 501/69 |
| 6,992,026 B2 | 1/2006 | Fukuyo et al. | |
| 7,157,038 B2 | 1/2007 | Baird et al. | |
| 7,169,688 B2 | 1/2007 | Liu | |
| 7,396,742 B2 | 7/2008 | Fukuyo et al. | |
| 7,547,613 B2 | 6/2009 | Fukuyo et al. | |
| 7,592,238 B2 | 9/2009 | Fukuyo et al. | |
| 7,615,721 B2 | 11/2009 | Fukuyo et al. | |
| 7,626,137 B2 | 12/2009 | Fukuyo et al. | |
| 7,732,730 B2 | 6/2010 | Fukuyo et al. | |
| 7,825,350 B2 | 11/2010 | Fukuyo et al. | |
| 7,871,903 B2 | 1/2011 | Couch et al. | |
| 2005/0221044 A1 | 10/2005 | Gaume et al. | |
| 2006/0255195 A1 | 11/2006 | Chen et al. | |
| 2007/0090100 A1 | 4/2007 | Yonai et al. | |
| 2008/0286548 A1 | 11/2008 | Ellison et al. | |
| 2010/0055876 A1 | 3/2010 | Fukuyo et al. | |
| 2010/0176100 A1 | 7/2010 | Fukuyo et al. | |
| 2011/0021004 A1 | 1/2011 | Fukuyo et al. | |
| 2011/0027971 A1 | 2/2011 | Fukuyo et al. | |
| 2011/0027972 A1 | 2/2011 | Fukuyo et al. | |
| 2011/0037149 A1 | 2/2011 | Fukuyo et al. | |

FOREIGN PATENT DOCUMENTS

| | | |
|---|---|---|
| EP | 0793132 | 9/1997 |
| JP | 2002192369 | 7/2002 |
| JP | 2004268104 | 9/2004 |
| JP | 2004299969 | 10/2004 |
| JP | 2007290304 | 11/2007 |
| JP | 2009061462 | 3/2009 |
| JP | 200972829 | 4/2009 |
| JP | 4490883 | 6/2010 |
| KR | 626553 | 9/2006 |
| KR | 2007031467 | 3/2007 |
| KR | 100921662 | 10/2009 |
| KR | 934300 | 12/2009 |
| KR | 945980 | 3/2010 |

OTHER PUBLICATIONS

U.S. Appl. No. 61/067,130; by Matthew J. Dejneka et al, titled "Fining Agents for Silicate Glasses", filed on Feb. 26, 2008.

U.S. Appl. No. 61/067,732; by Matthew J. Dejneka et al, titled "Ion-Exchanged, Fast Cooled Glasses" filed on Feb. 29, 2008.

U.S. Appl. No. 61/087,324; by Kristen L. Barefoot et al, titled "Chemically Tempered Cover Glass", filed Aug. 8, 2008.

U.S. Appl. No. 61/079,995, by Douglas C. Allan et al, titled "Glass With Compressive Surface for Consumer Applications", filed Jul. 11, 2008.

U.S. Appl. No. 61/084,398, by Christopher M. Lee et al, titled "Dual Stage Ion Exchnage for Chemical Strengthening of Glass", filed Jul. 29, 2008.

* cited by examiner

METHOD OF SEPARATING STRENGTHENED GLASS

CROSS-REFERENCE TO RELATED APPLICATIONS

This application is a continuation-in-part of U.S. patent application Ser. No. 12/388,837, filed Feb. 19, 2009, and entitled "Method of Separating Strengthened Glass." This application is also related to U.S. Provisional Patent Application Ser. No. 61/235,767, filed Aug. 21, 2009, and entitled "Crack and Scratch Resistant Glass and Enclosures Made Therefrom," but does not claim priority thereto.

BACKGROUND

Thermal tempering and chemical treatments by ion exchange are widely recognized means for strengthening glass. Glasses strengthened by such processes have compressive stress in the surface layers and tensile stress in the bulk.

Glasses that are either tempered or chemically strengthened are difficult, if not impossible, to cut or separate into pieces of desired shape and/or sizes. Conventional score-and-break techniques do not work because the initial crack does not propagate along the score line, but instead tends to bifurcate multiple times. Consequently, the glass sample usually breaks into multiple pieces. Cutting operations are therefore performed before carrying out strengthening operations.

SUMMARY

A method of cutting a glass sheet that has been thermally or chemically strengthened along a predetermined line, axis, or direction with high speed and with minimum damage on the cut edges is provided. The strengthened glass sheet may be cut into at least two pieces, one of which having a predetermined shape or dimension. At least one damage line is formed within the strengthened glass sheet. The at least one damage line is formed outside the strengthened compressive stress surface layers and within the tensile stress layer of the strengthened glass sheet. The at least one damage line may be formed by laser treatment. In one embodiment, a crack is initiated in the strengthened glass sheet (e.g., as an edge score) and propagated along the at least one damage line to separate the strengthened glass sheet along the predetermined line, axis, or direction into at least two pieces. In another embodiment, crack initiation and propagation is not utilized to separate the strengthened glass sheet but rather a UV-laser may be used without edge scoring.

In one embodiment, a method of separating a strengthened glass sheet, the method includes providing the strengthened glass sheet, the strengthened glass sheet having a first surface and a second surface. Each of the first surface and the second surface has a strengthened surface layer under a compressive stress and extending from the surface to a depth of layer, and a central region under tensile stress. The strengthened glass sheet is an aluminoborosilicate glass material having at least one alkali metal oxide modifier, and the ratio $$\frac{Al_2O_3(mol\ \%) + B_2O_3(mol\ \%)}{\sum\ modifiers\ (mol\ \%)} > 1.$$

The method further includes forming at least one damage line in the central region; and initiating and propagating a crack to separate the strengthened glass sheet into at least two pieces along the at least one damage line.

In another embodiment, a method of separating a strengthened glass sheet, the method includes providing the strengthened glass sheet, the strengthened glass sheet having a first surface and a second surface. Each of the first surface and the second surface have a strengthened surface layer under a compressive stress and extending from the surface to a depth of layer, and a central region under a tensile stress. The strengthened glass sheet is an aluminoborosilicate glass material having at least one alkali metal oxide modifier, and the ratio $$\frac{Al_2O_3(mol\ \%) + B_2O_3(mol\ \%)}{\sum\ modifiers\ (mol\ \%)} > 1.$$

The method further includes forming a first laser-induced damage line in the central region and forming a second laser-induced damage line. The second laser-induced damage line is located between the strengthened surface layer of the first surface and the first laser-induced damage line, and is parallel to the first laser-induced damage line. The first laser-induced damage line and the second laser-induced damage line define a plane being perpendicular to the first surface and the second surface. The method further includes initiating and propagating a crack to separate the strengthened glass sheet into at least two pieces, wherein at least one of the pieces has at least one of a predetermined shape and a predetermined dimension.

In yet another embodiment, a strengthened glass article includes a first surface, a second surface and at least one edge joining the first and second surfaces. Each of the first surface and the second surface has an ion exchanged strengthened surface layer under a compressive stress and extending from the surface to a depth of layer, and a central region under a tensile stress. The strengthened glass sheet is an aluminoborosilicate glass material having at least one alkali metal oxide modifier, and the ratio $$\frac{Al_2O_3(mol\ \%) + B_2O_3(mol\ \%)}{\sum\ modifiers\ (mol\ \%)} > 1.$$

The at least one edge is formed by forming at least one laser-induced damage line in a central region of a strengthened glass sheet comprising the aluminoborosilicate glass material and having the ion exchanged strengthened surface layers, and initiating and propagating a crack along the at least one laser-induced damage line to separate the strengthened glass article from the strengthened glass sheet along the at least one edge to form the at least one edge.

These and other aspects, advantages, and salient features will become apparent from the following detailed description, the accompanying drawings, and the appended claims.

DETAILED DESCRIPTION

Figure 1:
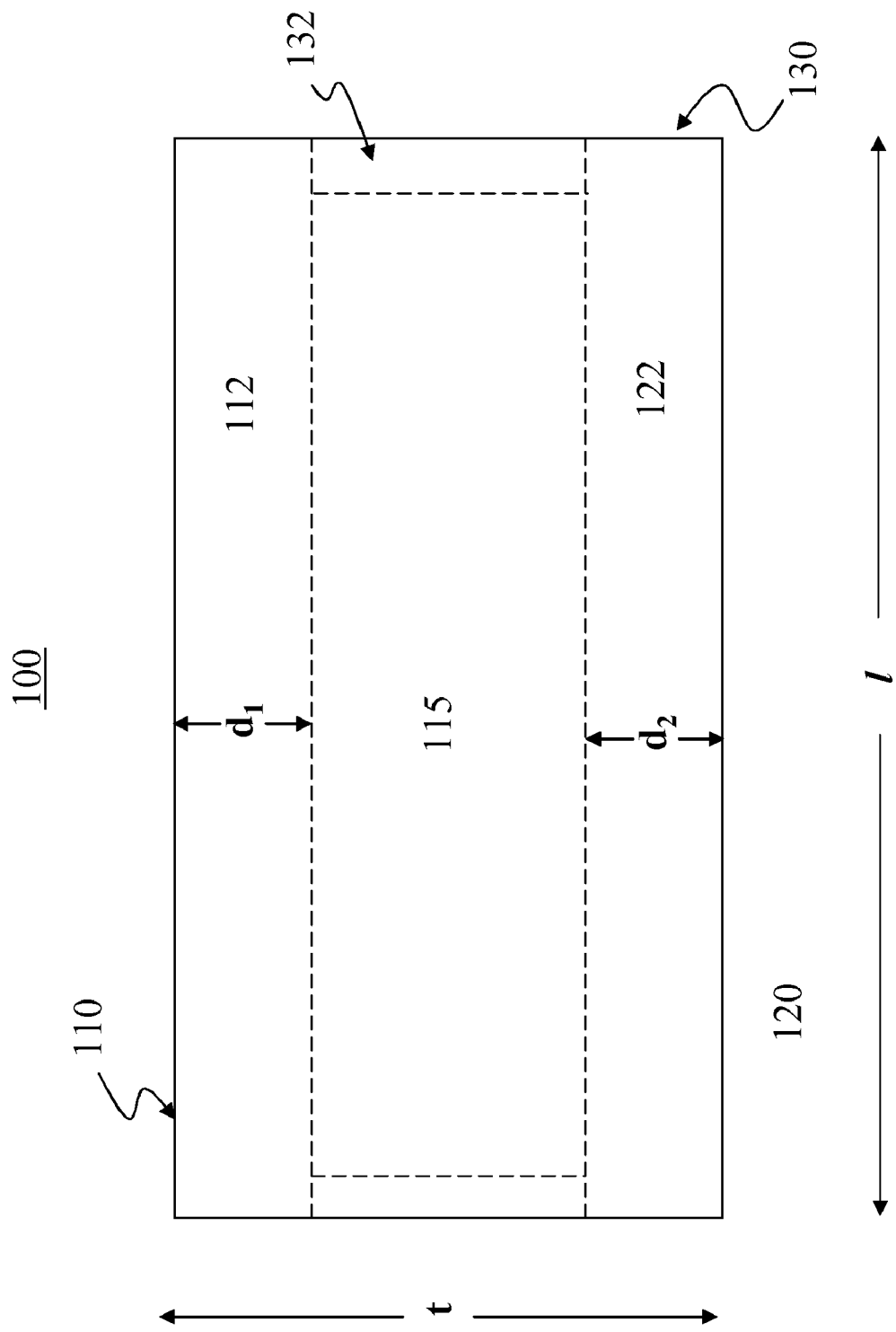
FIG. 1 is a schematic cross-sectional view of a strengthened glass sheet.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range.

Referring to the drawings in general and to FIG. 1 in particular, it will be understood that the illustrations are for the purpose of describing a particular embodiment and are not intended to limit the disclosure or appended claims thereto. The drawings are not necessarily to scale, and certain features and certain views of the drawings may be shown exaggerated in scale or in schematic in the interest of clarity and conciseness.

As used herein, the terms "separate," "divide," and "cut," unless otherwise specified, are considered to be equivalent terms that are used interchangeably and refer to the separation or division of a glass article, such as a planar sheet, into one or more pieces by physical means.

Glasses that are strengthened by either thermal tempering or chemical processes such as ion exchange have surface layers that are under compressive stress and a central portion under a tensile stress. The presence of such layers makes such glasses difficult to separate or divide into individual pieces of desired shape and dimensions by conventional methods, such as score-and-break techniques. Rather than propagating along a single score line, cracks tend to bifurcate multiple times. Consequently, the glass usually breaks into multiple pieces of random shape.

A method of controllably separating a strengthened glass sheet into multiple pieces or parts is provided. The method is controllable in the sense that the glass sheet is separated along a predetermined line or plane in a controlled or guided fashion. At least one of the pieces formed by separating the strengthened glass sheet has at least one of a predetermined shape and predetermined dimension. The term predetermined as used herein means that a particular property was determined prior to cutting or separating the strengthened glass sheet. For example, a piece formed by separating the strengthened glass sheet may have a predetermined shape that is circular having a particular radius. The shape and dimension is determined prior to separating the piece from the strengthened glass sheet. The method comprises first providing a strengthened glass sheet having first and second surfaces, strengthened surface layers under compressive stress and extending from each of the first and second surfaces to a depth of layer, and a central region under a tensile stress. At least one damage line is then formed in the central region and outside the strengthened surface layers. A crack is then initiated and propagated along the at least one damage line to separate the strengthened glass sheet into multiple pieces, one of which has at least one of a predetermined shape and predetermined dimension.

A strengthened glass sheet is first provided. The strengthened glass sheet has a first surface and a second surface that are substantially parallel to—or conform to the shape of (i.e., conformal to)—each other. The strengthened glass sheet may be planar or, alternatively, may be a three dimensional sheet having, for example, at least one curved surface, or the like.

Turning to FIG. 1, a cross-sectional view of a strengthened glass sheet is schematically shown. Strengthened glass sheet 100 has a thickness t and length l, a first surface 110 and second surface 120 that are substantially parallel to each other, central portion 115, and edges 130 joining first surface 110 to second surface 120. Strengthened glass sheet 100 is either thermally or chemically strengthened, and has strengthened surface layers 112, 122 extending from first surface 110 and second surface 120, respectively, to depths $d_1$, $d_2$ below each surface. Strengthened surface layers 112, 122 are under a compressive stress, while central portion 115 is under a tensile stress, or in tension. The tensile stress in central portion 115 balances the compressive stresses in strengthened surface layers 112, 122, thus maintaining equilibrium within strengthened glass sheet 100. The depths $d_1$, $d_2$ to which the strengthened surface layers 112, 122 extend are generally referred to individually as the "depth of layer." A portion 132 of edge 130 may also be strengthened as a result of the strengthening process. Thickness t of strengthened glass sheet 100 is generally in a range from about 0.2 mm up to about 2 mm and, in some embodiments, up to about 3 mm. In one embodiment, thickness t is in a range from about 0.5 mm up to about 1.3 mm.

Strengthened glass sheet 100 comprises, consists essentially of, or consists of an alkali aluminoborosilicate glass having a densification mechanism such that the strengthened glass sheet 100 does not undergo deformation by subsurface shear faulting, but instead undergoes indentation deformation by densification under an indentation load, thereby yielding higher damage resistance. In one embodiment, the strengthened glass sheet 100 undergoes indentation deformation by a densification under an indentation load of at least 500 gf, which may make flaw/crack initiation more difficult. Non-limiting examples of such alkali aluminoborosilicate glasses having a densification mechanism are described in U.S. Patent Application No. 61/235,767, by Kristen L. Barefoot et al., entitled "Crack and Scratch Resistant Glass and Enclosures Made Therefrom," filed on Aug. 21, 2009, the contents of which are incorporated herein by reference in their entirety.

Cutting a glass after the glass is ion exchanged exposes areas on the edges that are under tension, which reduces the strength of the edge itself. The edge is made more robust—i.e., less susceptible to damage—by providing a glass having higher damage resistance before ion exchange.

In some embodiments, the strengthened glass deforms upon indentation under an indentation load of at least 500 gram force (gf) primarily by a mechanism in which the glass undergoes densification rather than shear faulting. The glass may be free of subsurface faulting and radial cracks upon deformation and may consequently be more resistant to damage than typical ion-exchangeable glasses and, when strengthened by ion exchange, is more resistant to crack initiation by shear faulting. In one embodiment, the strengthened glass sheet is an ion exchanged glass having a Vickers median/radial crack initiation threshold of at least 10 kilogram force (kgf). In a second embodiment, the strengthened glass sheet is an ion exchanged glass having a Vickers median/radial crack initiation threshold of at least about 20 kgf and, in a third embodiment, the strengthened glass sheet is an ion exchanged glass having a Vickers median/radial crack initiation threshold of at least about 30 kgf. Unless otherwise specified, the Vickers median/radial crack threshold is determined by measuring the onset of median or radial cracks in 50% relative humidity at room temperature.

The densification mechanism described above may be attributed to the absence or lack of non-bridging oxygens (NBOs) in the glass structure, high molar volume (at least 27 cm$^3$/mol), and low Young's modulus (less than about 69 GPa) of the glass. In the aluminoborosilicate glasses having the densification mechanism described herein, a structure having substantially no non-bridging oxygens (NBO-free) is achieved and the inequality:

$$\frac{Al_2O_3 (\text{mol \%}) + B_2O_3 (\text{mol \%})}{\sum \text{modifiers (mol \%)}} > 1, \quad (1)$$

where $Al_2O_3$ and $B_2O_3$ are intermediate glass formers and alkali metal (e.g., $Li_2O$, $Na_2O$, $K_2O$, $Rb_2O$, $Cs_2O$) and alkaline earth metal oxides (e.g., MgO, CaO, SrO, BaO) are modifiers, is satisfied. To obtain sufficient depth of layer and compressive stress by ion exchange, it is preferable that $0.9 < R_2O/Al_2O_3 < 1.3$. Given a particular compressive stress and compressive depth of layer, any ion-exchangeable silicate glass composition that is described by equation (1) and contains alkali metals (e.g., $Li^+$, $Na^+$, $K^+$) should have a high resistance to both crack initiation and crack propagation following ion exchange. Prior to ion exchange, such aluminoborosilicate glasses have a Vickers median/radial crack initiation threshold of at least 500 gf and, in one embodiment, the glasses have Vickers median/radial crack initiation threshold of at least 1000 gf.

In one embodiment, the strengthened glass sheet comprises, consists essentially of, or consists of a strengthened glass that, when ion exchanged, is resistant to damage, such as crack initiation and propagation. The glass comprises at least one alkali metal modifier, wherein the ratio $(Al_2O_3 + B_2O_3)/\Sigma(\text{modifiers}) > 1$. In one embodiment, $(Al_2O_3 + B_2O_3)/\Sigma(\text{modifiers}) \geq 1.45$. As the value of this ratio increases, the damage resistance of the glass increases. In addition, an increase in the ratio or a substitution of $B_2O_3$ for $Al_2O_3$ results in a decrease in Young's modulus. In one embodiment, the Young's modulus of the aluminoborosilicate glass is less than about 69 GPa. In one embodiment, the Young's modulus of the aluminoborosilicate glass is less than about 65 GPa. In another embodiment, the Young's modulus of the aluminoborosilicate glass is in a range from about 57 GPa up to about 69 GPa. In another embodiment, the strengthened glass sheet has a compressive stress of at least about 400 MPa and a depth of layer of at least about 15 μm, in another embodiment, at least about 25 μm, and, in a third embodiment, at least about 30 μm.

In a particular embodiment, the strengthened glass sheet comprises, consists essentially of, or consists of an ion exchangeable aluminoborosilicate glass that has been strengthened, for example, by ion exchange. In a particular embodiment, the aluminoborosilicate glass comprises, consists essentially of, or consists of: 60-72 mol % $SiO_2$; 9-16 mol % $Al_2O_3$; 5-12 mol % $B_2O_3$; 8-16 mol % $Na_2O$; and 0-4 mol % $K_2O$, wherein $(Al_2O_3 + B_2O_3)/\Sigma(\text{modifiers}) > 1$, and has a molar volume of at least 27 cm$^3$/mol. In some embodiments, the glass further includes 0-5 mol % of at least one of $P_2O_5$, MgO, CaO, SrO, BaO, ZnO, and $ZrO_2$. In other embodiments, the glass is batched with 0-2 mol % of at least one fining agent selected from a group that includes $Na_2SO_4$, NaCl, NaF, NaBr, $K_2SO_4$, KCl, KF, KBr, and $SnO_2$. The aluminoborosilicate glass is, in some embodiments, substantially free of lithium, whereas in other embodiments, the aluminoborosilicate glass is substantially free of at least one of arsenic, antimony, and barium. In another embodiment, the aluminoborosilicate glass is down-drawable by processes known in the art, such as slot-drawing, fusion drawing, redrawing, and the like, and has a liquidus viscosity of at least 130 kilopoise.

As previously described herein, the glass, in one embodiment, is chemically strengthened by an ion exchange process in which ions in the surface layer of the glass are replaced by larger ions having the same valence, or oxidation state. In one particular embodiment, the ions in the surface layer and the larger ions are monovalent alkali metal cations, such as $Li^+$ (when present in the glass), $Na^+$, $K^+$, $Rb^+$, and $Cs^+$. Alternatively, monovalent cations in the surface layer may be replaced with monovalent cations other than alkali metal cations, such as $Ag^+$, $Cu^+$, $Tl^+$, or the like.

Ion exchange processes are typically carried out by immersing glass in a molten salt bath containing the larger ions. It will be appreciated by those skilled in the art that parameters for the ion exchange process, including, but not limited to, bath composition and temperature, immersion time, the number of immersions of the glass in a salt bath (or baths), use of multiple salt baths, additional steps such as annealing, washing, and the like, are generally determined by the composition of the glass and the desired depth of layer and compressive stress of the strengthened glass that is to be achieved as a result of the strengthening operation. By way of example, ion exchange of alkali metal-containing glasses may be achieved by immersion in at least one molten bath containing a salt such as, but not limited to, nitrates, sulfates, and chlorides of the larger alkali metal ion. The temperature of the molten salt bath is typically in a range from about 370° C. up to about 450° C., while immersion items range from about 15 minutes up to about 16 hours.

Non-limiting examples of ion exchange processes are provided in U.S. Pat. No. 7,666,511, by Adam J. Ellison et al., entitled "Down-Drawable, Chemically Strengthened Glass for Cover Plate," filed on Jul. 31, 2007, which claims priority from U.S. Provisional Patent Application 60/930,808, filed on May 22, 2007, and having the same title; U.S. patent application Ser. No. 12/277,573, by Matthew J. Dejneka et al., entitled "Glasses Having Improved Toughness and Scratch Resistance," filed on Nov. 25, 2008, which claims priority from U.S. Provisional Patent Application 61/004,677, filed on Nov. 29, 2007; U.S. patent application Ser. No. 12/392,577, by Matthew J. Dejneka et al., entitled "Fining Agents for Silicate Glasses," filed Feb. 25, 2009, which claims priority from U.S. Provisional Patent Application No. 61/067,130, filed Feb. 26, 2008; U.S. patent application Ser. No. 12/393,241, by Matthew J. Dejneka et al., entitled "Ion-Exchanged, Fast Cooled Glasses," filed Feb. 26, 2009, which claims priority from U.S. Provisional Patent Application No. 61/067,732, filed Feb. 29, 2008; and U.S. patent application Ser. No. 12/537,393, by Kristen L. Barefoot et al., entitled "Chemically Tempered Cover Glass," filed Aug. 7, 2009, which claims priority from U.S. Provisional Patent Application No. 61/087,324, filed Aug. 8, 2008. In addition, non-limiting examples of ion exchange processes in which glass is immersed in multiple ion exchange baths, with washing and/or annealing steps between immersions are described in U.S. patent application Ser. No. 12/500,650, by Douglas C. Allan et al., entitled "Glass with Compressive Surface for Consumer Applications," filed Aug. 7, 2009, which claims priority from U.S. Provisional Patent Application No. 61/079,995, filed Jul. 11, 2008, in which glass is strengthened by immersion in multiple, successive, ion exchange treatments in salt baths of different concentrations; and U.S. patent application Ser. No. 12/510,599, by Christopher M. Lee et al., entitled "Dual Stage Ion Exchange for Chemical Strengthening of Glass," filed Jul. 28, 2009, which claims priority from U.S. Provisional Patent Application No. 61/084,398, filed Jul. 29, 2008, in which glass is strengthened by ion exchange in a first bath that is diluted with an effluent ion, followed by immersion in a second bath having a smaller concentration of the effluent ion than the first bath. The contents of the patent and patent applications listed above are incorporated herein by reference in their entirety.

In another embodiment, strengthened glass sheet 100 may be strengthened by thermal tempering. In this technique, strengthened glass sheet 100 is heated up to a temperature that is greater than the strain point of the glass and rapidly cooled to a temperature below the strain point to create strengthened surface layers 112, 122.

Various compositions of the aluminoborosilicate glasses having a deformation mechanism described above are listed in Table 1 and Table 2. Samples a, b, c, and d in Table 1 nominally do not have non-bridging oxygens; i.e., $Al_2O_3 + B_2O_3 = Na_2O$ or $Al_2O_3 + B_2O_3 - Na_2O = 0$ (i.e., $(Al_2O_3+B_2O_3)/\Sigma(\text{modifiers})=1$). Regardless of whether $B_2O_3$ or $Al_2O_3$ is used to consume the NBOs created by the presence of the $Na_2O$ modifier in these sample compositions, all of the above samples exhibited low (i.e., 100-300 gf) crack initiation thresholds. In glasses e and f, however, an excess of $B_2O_3$ is created by increasing the $Al_2O_3$ content while decreasing the concentration of alkali metal oxide modifiers. For samples e and f, $(Al_2O_3+B_2O_3)/\Sigma(\text{modifiers})>1$.

Table 2 lists additional sample compositions g, h and i that were subjected to various ion exchange processes. For example, the samples g, h, and i were subjected to various $KNO_3$ bath temperatures and exposure durations. Further, some samples were rapidly quenched from above the glass transition temperature (referred to in Table 2 as "fictivated") prior to the ion exchange process. The compressive stress (CS) and depth of layer (DOL) values were determined for the sample compositions g, h, and i for the different ion exchange processes. The center tension (CT) values provided in Table 2 were calculated based on the CT and DOL values. It should be understood that samples listed in Tables 1 and 2 are for illustrative purposes only, and no particular limitations are intended by such sample composition listings.

TABLE 2

Compositions and properties of ion exchanged aluminoborosilicate glasses.

| | Glass Sample | g | h | i |
|---|---|---|---|---|
| Composition Mole % | $SiO_2$ | 65.81 | 64.13 | 64.29 |
| | $Al_2O_3$ | 10.39 | 12.54 | 13.95 |
| | $B_2O_3$ | 0.58 | 9.55 | 6.94 |
| | $Na_2O$ | 14.18 | 13.59 | 14.13 |
| | $K_2O$ | 2.50 | 0.01 | 0.51 |
| | MgO | 5.76 | 0.01 | 0.02 |
| | CaO | 0.58 | 0.02 | 0.07 |
| | $SnO_2$ | 0.18 | 0.12 | 0.10 |
| | Strain | 551 | 529 | 553 |
| | Anneal | 600 | 580 | 606 |
| | Softening | 843 | 817.2 | 870.7 |
| | Exp Coef | 91 | | 79.4 |
| | Density | 2.461 | 2.356 | 2.375 |
| | Liquidus | 860 | | 880 |
| | Phase | Nepheline | | Albite |
| | SOC (nm/cm/MPa) | 28.80 | 35.24 | 33.80 |
| Fictivated IX Data 8 Hrs | CS 370° C. (MPa) | 889.1059 | 743.5641 | 838.3803 |
| | CS 390° C. | 841.7913 | | 770.5593 |
| | CS 410° C. | 799.9036 | 595.5732 | 718.1476 |
| | DOL 370° C. (μm) | 28.146 | 24 | 33.973 |
| | DOL 390° C. | 39.393 | | 48.761 |
| | DOL 410° C. | 54.545 | 42 | 58.692 |
| Fictivated IX Data 15 Hrs | CS 370° C. | 862.8234 | 724.6141 | 811.1667 |
| | CS 390° C. | 834.1261 | | 732.1668 |
| | CS 410° C. | 778.422 | 526.0897 | 672.7195 |
| | DOL 370° C. | 39.777 | 33 | 46.711 |
| | DOL 390° C. | 51.534 | | 65.775 |
| | DOL 410° C. | 67.679 | 61 | 82.554 |
| Annealed IX Data 8 Hrs | CS 370° C. | 952.4398 | 850.9478 | 915.0505 |
| | CS 390° C. | 961.537 | | 862.1435 |
| | CS 410° C. | 931.2729 | 723.7117 | 805.3314 |
| | DOL 370° C. | 27.341 | 17 | 25.379 |
| | DOL 390° C. | 38.96 | | 40.259 |
| | DOL 410° C. | 51.557 | 33 | 47.798 |
| Annealed IX Data 15 Hrs | CS 370° C. | 956.374 | 827.4858 | 896.5275 |
| | CS 390° C. | 939.7077 | | 827.4016 |
| | CS 410° C. | 882.3109 | 677.6901 | 755.7468 |
| | DOL 370° C. | 34.458 | 23 | 37.627 |
| | DOL 390° C. | 53.598 | | 52.224 |
| | DOL 410° C. | 68.854 | | 66.841 |
| Central | CT 370 | 26.52 | 18.75 | 30.56 |

TABLE 1

Compositions and properties of aluminoborosilicate glasses.

| Composition Mol % | a | b | c | d | e | f |
|---|---|---|---|---|---|---|
| $SiO_2$ | 64 | 64 | 64 | 64 | 64 | 64 |
| $Al_2O_3$ | 0 | 6 | 9 | 15 | 12 | 13.5 |
| $B_2O_3$ | 18 | 12 | 9 | 3 | 9 | 9 |
| $Na_2O$ | 18 | 18 | 18 | 18 | 15 | 13.5 |
| $SnO_2$ | 0.1 | 0.1 | 0.1 | 0.1 | 0.1 | 0.1 |
| $Al_2O_3 + B_2O_3 - Na_2O$ | 0 | 0 | 0 | 0 | 6 | 9 |
| Strain Point (° C.) | 537 | 527 | 524 | 570 | 532 | 548 |
| Anneal Point (° C.) | 575 | 565 | 564 | 619 | 577 | 605 |
| Softening Point (° C.) | 711 | 713 | 730 | 856 | 770 | 878 |
| Coefficient of Thermal Expansion ($\times 10^{-7}$/° C.) | 81.7 | 81.8 | 84.8 | 88.2 | 78 | 74.1 |
| Density (g/cm$^3$) | 2.493 | 2.461 | 2.454 | 2.437 | 2.394 | 2.353 |
| Pre-Ion Exchange Crack Initiation Load (gf) | 100 | 200 | 200 | 300 | 700 | 1100 |
| Pre-Ion Exchange Vickers Hardness at 200 gf | | 511 | 519 | 513 | 489 | 475 |
| Pre-Ion Exchange Indentation Toughness (MPa m^0.5) | | 0.64 | 0.66 | 0.69 | 0.73 | 0.77 |
| Pre-Ion Exchange Brittleness (μm^0.5) | | 7.8 | 7.6 | 7.3 | 6.6 | 6 |
| IX at 410° C. for 8 hrs in 100% $KNO_3$ | | | | | | |
| DOL (μm) | 10.7 | 15.7 | 20.4 | 34.3 | 25.6 | 35.1 |
| CS (MPa) | 874 | 795 | 773 | 985 | 847 | 871 |

TABLE 2-continued

Compositions and properties of ion exchanged aluminoborosilicate glasses.

| Glass Sample | | g | h | i |
|---|---|---|---|---|
| Tension | CT 390 | 36.00 | | 41.63 |
| 8 hr Fict | CT 410 | 48.97 | 27.31 | 47.76 |
| Central | CT 370 | 27.55 | 14.98 | 24.46 |
| Tension | CT 390 | 40.63 | | 37.75 |
| 8 hr Annealed | CT 410 | 53.53 | 25.57 | 42.56 |

After providing the strengthened glass sheet, at least one damage line is formed within strengthened glass sheet 100 in the central region 115, which is under tensile stress, of strengthened glass sheet 100. In the embodiment schematically shown in FIG. 2, first and second damage lines 140, 150 are formed in central region 115. The at least one damage line is formed along a predetermined axis, line, or direction within strengthened glass sheet 100 and is located outside of strengthened surface layers 112, 122. The at least one damage line is formed in a plane that is perpendicular to first surface 110 and second surface 120.

In one embodiment, the damage lines are formed by irradiating strengthened glass sheet 100 with a laser that operates in the window of transparency of the glass transmission spectrum. Damage within the bulk of strengthened glass sheet 100 is generated by nonlinear absorption when the intensity or fluence of the laser beam exceeds a threshold value. Rather than creating damage lines by heating the glass, nonlinear absorption creates damage lines by breaking molecular bonds; the bulk of strengthened glass sheet 100 experiences no excessive heating. In one embodiment, the laser is a nanosecond pulsed Nd laser operating at the fundamental wavelength of 1064 nm, or harmonics thereof (e.g., 532 nm, 355 nm), with a repetition rate of 10-150 kHz. The power of the nanosecond-pulsed Nd laser is in a range from about 1 W up to about 4 W.

Figure 2:
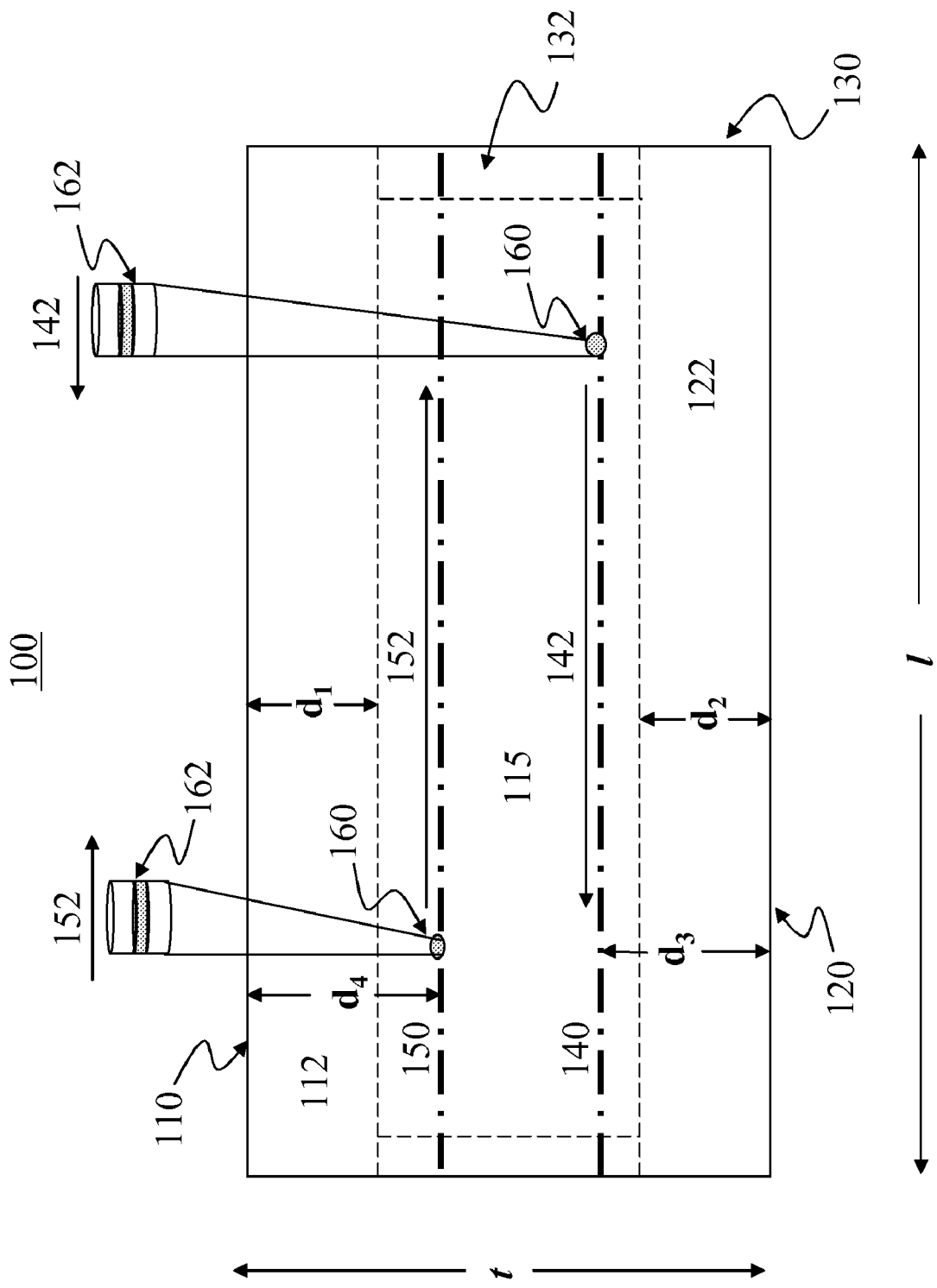
FIG. 2 is a schematic cross-sectional view of a strengthened glass sheet having laser-formed damage lines.

The formation of damage lines in strengthened glass sheet 100 by laser irradiation is schematically shown in FIG. 2. A first laser-formed damage line 140 is formed by irradiating strengthened glass sheet 100 with laser beam 160, which is generated by laser 162 and laser optics (not shown) that are needed to focus laser beam 160. Laser beam 160 is focused above second surface 120 and second strengthened surface layer 122 to form first damage line 140. First damage line 140 is formed at a depth $d_3$ from second surface 120, where $d_3$ is greater than depth $d_2$ of second strengthened surface layer 122. Thus, first damage line 140 is located within central region 115, which is under tensile stress, and outside the surface region—i.e., second strengthened surface layer 122—that is under compressive stress. At least one of strengthened glass sheet 100 and laser beam 160 is translated in direction 142 along line 1 of strengthened glass sheet 100 to form first damage line 140. In one embodiment, strengthened glass sheet 100 is translated with respect to laser beam 160. In another embodiment, laser beam 160 is translated with respect to strengthened glass sheet 100. Such movement may be accomplished using translatable stages, tables, beam scanners, and the like that are known in the art.

After forming first damage line 140, laser beam 160 is refocused below first surface 110 and first strengthened surface layer 112 to form second damage line 150 in central region 115. Second damage line 150 is formed at a depth $d_4$, where $d_4$ is greater than depth $d_1$ of first strengthened surface layer 112, and between first damage line 140 and first strengthened layer 112. Thus, second damage line 150 is located outside the surface region—i.e., first strengthened surface layer 112—that is under compressive stress.

In one embodiment, laser beam 160 is translated in direction 152 along line 1 of strengthened glass sheet 100 to form second damage line 150 by moving at least one of strengthened glass sheet 100 and laser beam 160. In one embodiment, direction 152 of translation of laser beam 160 or strengthened glass sheet 100 that is used to form second damage line 150 is opposite to direction 142 of translation that is used to form first damage line 140. In one embodiment, first damage line 140, which is furthest from laser 162 and the associated laser optics, is formed first, followed by formation of second damage line 150, which is closer to laser 162 and associated laser optics. In one embodiment, first and second damage lines 140, 150 are formed by laser beam 160 at a rate ranging from about 30 cm/s up to about 50 cm/s. In another embodiment, first damage line 140 and second damage line 150 may be formed simultaneously by splitting laser beam 160.

In one embodiment, formation of first and second damage lines 140, 150 includes overwriting, or making at least two passes, with laser beam 160 along each damage line; i.e., laser beam 160 is translated along each damage line at least two times, preferably in succession (e.g., within 0.2-5 seconds) of each other. This may be accomplished by splitting laser beam 160 or by other means known in the art, so as to make multiple passes simultaneously with only a slight delay of about 0.1 second For a strengthened glass sheet 100 having a thickness t of about 1 mm, the depths $d_3$, $d_4$ of first and second damage lines 140, 150 below first and second surfaces 110, 120, respectively, are in a range form about 50 μm up to about 350 μm. In one embodiment, depths $d_3$, $d_4$ are in a range from about 100 μm up to about 150 μM.

Table 3 lists the laser power and laser translation speed when using a 355-nm laser for separating four exemplary strengthened glass sheets having the deformation mechanism described hereinabove. Samples j, k, l, and m have different thicknesses and/or strength properties. It should be understood that the results and information provided in Table 3 are for illustrative purposes only.

TABLE 3

Exposure conditions for separating strengthened glass sheets.

| Glass Type (thickness) | CS (MPa) | DOL (um) | CT (est., MPa) | Power (W) | Speed (cm/s) |
|---|---|---|---|---|---|
| Sample j (0.2 mm) | 765 | 20 | 96 | 1.4 | 30 |
| Sample k (1.0 mm) | 615 | 59 | 37 | 3.0-3.5 | 30 |
| Sample l (1.0 mm) | 843 | 50 | 42 | 3.2 | 30 |
| Sample m (1.0 mm) | 685 | 65 | 46 | 3.2 | 30 |

The glass composition for sample j, k, l, and m were the same as sample h listed in Table 2. A single damage line was scanned twice with a 1.4 W laser to separate sample j, while two damage lines were formed within the 1.0 mm samples, with a laser power of 3.0-3.5 W. It is noted that the laser translation speed was hardware-limited and not limited by the process. As such, faster translation speeds may be utilized.

After forming the at least one damage line in strengthened glass sheet 100, a crack is initiated and propagated to separate strengthened glass sheet 100 into a plurality of smaller glass pieces, at least one of which is of the desired or predetermined dimensions and/or shape. Strengthened glass sheet 100 is separated along a plane defined by the damage lines formed within the strengthened glass sheet 100. Referring to FIG. 2, strengthened glass sheet 100 is separated along predetermined line l and a plane defined by first damage line 140 and second damage line 150.

Final and/or complete glass separation may be accomplished by those means known in the art such, but not limited to, as manual or mechanical flexion of strengthened glass sheet 100 on opposite sides of the plane formed by the damage lines. In one embodiment, the glass separation is accomplished by manual or mechanical flexion of the glass after the damage line or lines are inscribed with the laser. In another embodiment, a scribe may be used to introduce a flaw on either first or second surface 110, 120 to initiate the crack, which then propagates along first and second damage lines 140, 150. In another embodiment, mechanical scribes of about 2-3 mm in length may be made on edge 130 of strengthened glass sheet 100 to facilitate crack initiation. In another embodiment, glass separation is achieved by immersing strengthened glass sheet 100 in a liquid, such as water. In still another embodiment, self-separation may be achieved by repeated overwriting of first and second damage lines 140, 150 with laser beam 160. For example, strengthened glass sheets of some alkali aluminoborosilicate glasses may be self-separated by overwriting first and second damage lines 140,150 at least twice with laser beam 160. Alternatively, the power of laser beam 162 may be increased to a level that is sufficient to affect separation. Strengthened alkali aluminoborosilicate glass sheets may, for example, be completely separated by using a 355 nm nanosecond pulsed Nd laser having a power of at least 1 W.

Figure 3:
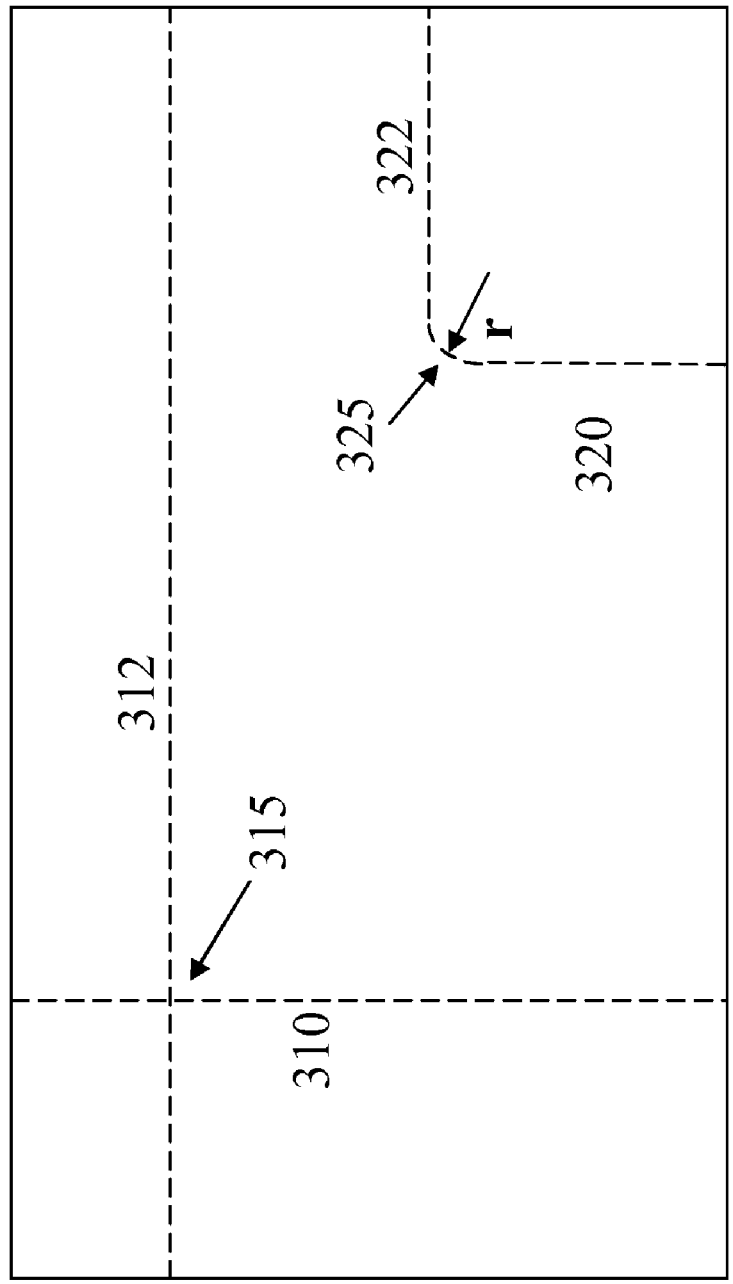
FIG. 3 is a schematic top view top view of a strengthened glass sheet having a plurality of cuts.

Using the methods described herein, strengthened glass sheet 100 may be separated or cut along a predetermined straight line (e.g., line l in FIGS. 1 and 2) to form a plurality of smaller glass sheets with little or no chipping along the edge created by separation of strengthened glass sheet 100. A top view of strengthened glass sheet 100 having a plurality of cuts is schematically shown in FIG. 3. Straight cuts 310, 312 may cross or intersect each other at right angles to yield cut glass sheets having square corners 315. Alternatively, the methods described herein may be used to make radius cuts 325 (i.e., a cut following an arc having radius r) in strengthened glass sheet 100, thus providing cut glass sheets cut along lines 320, 322 having rounded corners 325. Such radius cuts, in one embodiment, may have a radius r of greater than or equal to about 5 mm. Whereas it is problematic to cut a strengthened glass sheet into narrow strips by other means, the methods described herein may be used to cut a strengthened glass sheet into strips as narrow as 3 mm. The methods described herein also allow strengthened glass sheets to be cut with zero-width kerf (i.e., substantially no loss of material at the point of separation) and with little or no generation of debris.

A strengthened glass article is also provided. The strengthened glass article has a first surface and a second surface. Each of the first surface and the second surface has a strengthened surface layer under a compressive stress and extending from the surface to a depth of layer, and a central region under a tensile stress. The strengthened glass article also has at least one edge joining the first and second surface, wherein the at least one edge is substantially free of chipping.

The at least one edge is formed by separating strengthened glass sheet 100, using the methods described herein above. The at least one edge is formed along the plane at which strengthened glass sheet 100 is separated into at least two pieces.

The strengthened glass article may be any glass that is either chemically or thermally strengthened, as described hereinabove. In one embodiment, the glass is an alkali aluminoborosilicate glass, such as those previously described herein.

The strengthened glass article is resistant to both chipping and scratching, and is well suited for use in cover plates for mobile communication and entertainment devices such as telephones, music players, video players, or the like; as a screen for portable computers; or in other applications that require strong and tough glass with good scratch resistance.

The following example illustrates the features and advantages provided by the methods described herein and is in no way intended to limit the disclosure or appended claims thereto.

EXAMPLE 1

A glass sample having the composition 64.13 mol % $SiO_2$; 12.55 mol % $Al_2O_3$; 9.55 mol % $B_2O_3$; 13.59 mol % $Na_2O$; 0.01 mol % $K_2O$; 0.01 mol % MgO; 0.02 mol % CaO; and 0.12 mol % $SnO_2$ underwent ion-exchange by immersion in a molten $KNO_3$ bath for fifteen hours at 410° C. The resulting thickness of the ion-exchanged layer on the surface of the glass was about 59 μm, and the compressive stress within the strengthened surface layers was about 615 MPa. The glass sample had a thickness of about 1.0 mm.

The glass sample was mounted on a computer-controlled XYZ stage and was translated at speed of about 30 cm/s. The output from a 355-nm nanosecond Nd laser was first focused about 130 μm above the rear surface (i.e., the surface of the glass farthest from the laser; e.g., second surface 120 in FIGS. 1 and 2) with a 0.27-NA lens. The mean power of the laser beam was 3.0 W, and the repetition rate was 150 kHz. After the first damage line was written near the rear surface, the beam was refocused about 130 μm below the front surface of the glass and the sample was traversed again to write the second damage line near the front surface. Each damage line was scanned twice with the laser, although a single pass may have also been sufficient. The two damage lines formed in the glass allowed the strengthened glass sheet to be divided by manual snapping or flexion.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure.

What is claimed is:

1. A method of separating a strengthened glass sheet, the method comprising:
  providing the strengthened glass sheet, the strengthened glass sheet having a first surface and a second surface, wherein:
  each of the first surface and the second surface has a strengthened surface layer under a compressive stress and extending from the surface to a depth of layer, and wherein the strengthened glass sheet has a central region under tensile stress; and
  the strengthened glass sheet comprises an aluminoborosilicate glass material having at least one alkali metal oxide modifier, and the ratio $$\frac{Al_2O_3(\text{mol \%}) + B_2O_3(\text{mol \%})}{\sum \text{modifiers (mol \%)}} > 1;$$

forming at least one laser-induced damage line in the central region at a predetermined depth below the first surface by irradiating the strengthened glass sheet with a nanosecond pulsed laser, wherein the nanosecond pulsed laser is operated at a power of less than about 4 W; and initiating and propagating a crack to separate the strengthened glass sheet into at least two pieces along the at least one damage line.

2. The method of claim 1, wherein forming the at least one damage line in the central region comprises forming a first damage line and a second damage line in the central region, the second damage line being located between the strengthened surface layer of the first surface and the first damage line, the first damage line and the second damage line defining a plane perpendicular to the first surface and the second surface.

3. The method of claim 1, wherein the strengthened surface layers of the first surface and the second surfaces are chemically strengthened surfaces.

4. The method of claim 1, wherein the strengthened surface layers are ion exchanged chemically strengthened surfaces.

5. The method of claim 4, wherein the strengthened surface layers of the first surface and the second surfaces have a compressive stress of at least about 400 MPa, the depth of layer is at least about 15 μm, and the central region has a tensile stress greater than about 15 MPa.

6. The method of claim 4, wherein the aluminoborosilicate glass material comprises:
60-72 mol % $SiO_2$; 9-16 mol % $Al_2O_3$; 5-12 mol % $B_2O_3$; 8-16 mol % $Na_2O$; and 0-4 mol % $K_2O$.

7. The method of claim 1, wherein $$\frac{Al_2O_3(mol\ \%) + B_2O_3(mol\ \%)}{\sum\ modifiers\ (mol\ \%)} > 1.45.$$

8. The method of claim 1, wherein the strengthened glass sheet has a Vickers median/radial crack initiation threshold of at least 10 kgf.

9. A method of separating a strengthened glass sheet, the method comprising:
providing the strengthened glass sheet, the strengthened glass sheet having a first surface and a second surface, wherein:
each of the first surface and the second surface have a strengthened surface layer under a compressive stress and extending from the surface to a depth of layer, and wherein the strengthened glass sheet has a central region under a tensile stress; and
the strengthened glass sheet comprises an aluminoborosilicate glass material having at least one alkali metal oxide modifier, and the ratio $$\frac{Al_2O_3(mol\ \%) + B_2O_3(mol\ \%)}{\sum\ modifiers\ (mol\ \%)} > 1;$$

forming a first laser-induced damage line in the central region at a predetermined depth below the first surface;
forming a second laser-induced damage line, wherein:
the second laser-induced damage line is located between the strengthened surface layer of the first surface and the first laser-induced damage line;
the second laser-induced damage line is parallel to the first laser-induced damage line; and
the first laser-induced damage line and the second laser-induced damage line define a plane being perpendicular to the first surface and the second surface; and
wherein the first and second laser-induced damage lines are formed by irradiating the strengthened glass sheet with a nanosecond pulsed laser, wherein the nanosecond pulsed laser is operated at a power of less than about 4 W; and
initiating and propagating a crack to separate the strengthened glass sheet into at least two pieces, wherein at least one of the pieces has at least one of a predetermined shape and a predetermined dimension.

10. The method of claim 9, wherein the strengthened surface layers are ion exchanged chemically strengthened surfaces.

11. The method of claim 10, wherein the strengthened surface layers of the first surface and the second surfaces have a compressive stress of at least about 400 MPa, the depth of layer is at least about 15 μm, and the central region has a tensile stress greater than about 15 MPa.

12. The method of claim 11, wherein the aluminoborosilicate glass material comprises: 60-72 mol % $SiO_2$; 9-16 mol % $Al_2O_3$; 5-12 mol % $B_2O_3$; 8-16 mol % $Na_2O$; and 0-4 mol % $K_2O$.

13. The method of claim 9, wherein $$\frac{Al_2O_3(mol\ \%) + B_2O_3(mol\ \%)}{\sum\ modifiers\ (mol\ \%)} > 1.45.$$

* * * * *